UNITED STATES PATENT OFFICE.

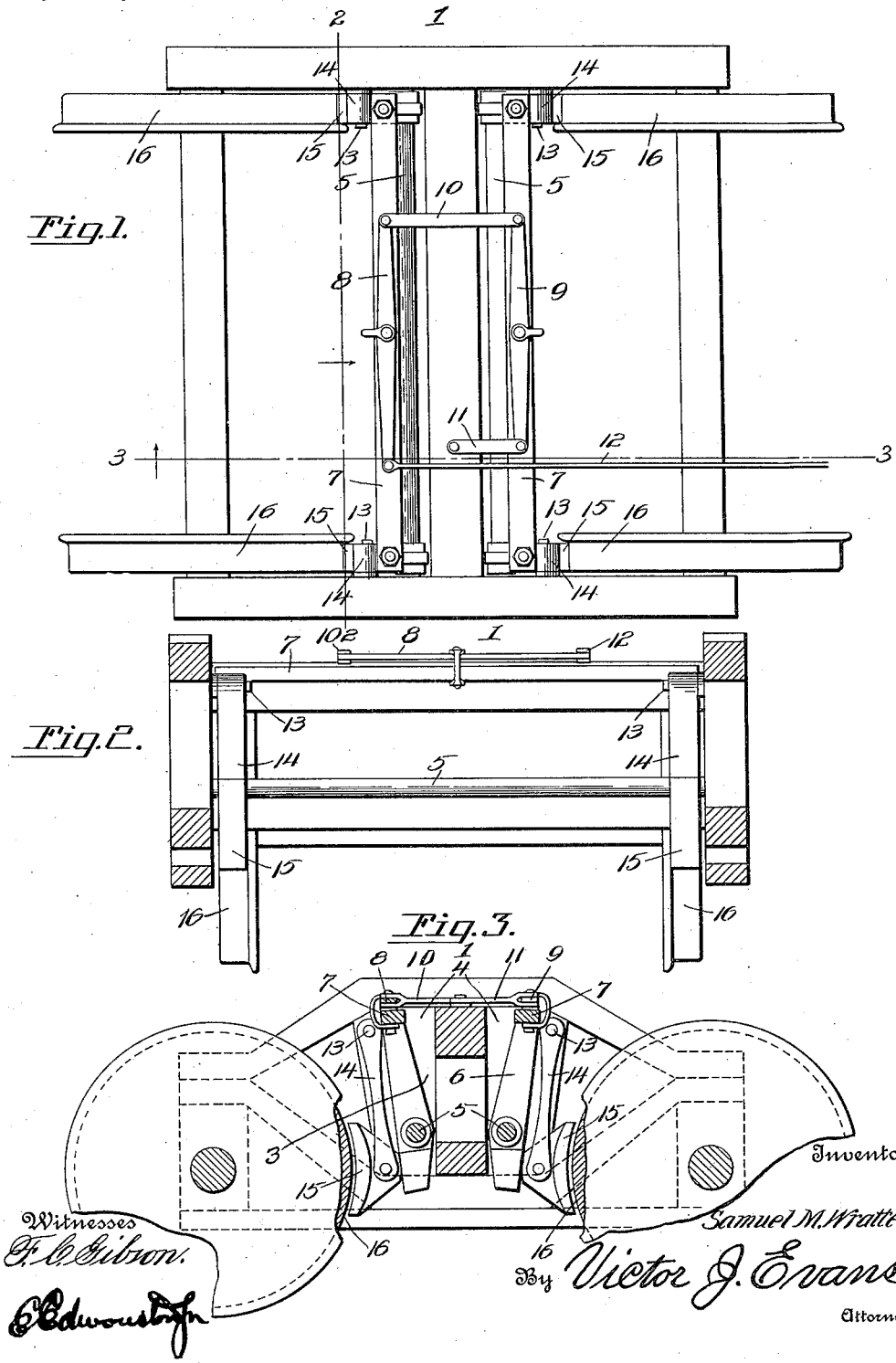

SAMUEL M. WRATTEN, OF WASHINGTON, INDIANA.

BRAKE MECHANISM.

1,024,385.  Specification of Letters Patent.  Patented Apr. 23, 1912.

Application filed November 22, 1910. Serial No. 593,717.

*To all whom it may concern:*

Be it known that I, SAMUEL M. WRATTEN, a citizen of the United States, residing at Washington, in the county of Daviess and State of Indiana, have invented new and useful Improvements in Brake Mechanism, of which the following is a specification.

This invention relates to a brake mechanism for controlling the brake heads and brake shoes of trucks and further relates to the means for supporting the brake heads. Heretofore the brake heads and shoes have been supported upon brake beams by what are known as bottom connections and when one brake head was worn the entire brake beam and bottom connection had to be removed so that the worn head might be cut off of the brake beam. Railroad companies are experiencing considerable difficulty from this and also have a number of wrecks on hand each year owing to the fact that when a brake head becomes worn and gets caught in the wheel from any cause, the entire brake beam and bottom connection are torn away and frequently thrown under the truck in such a manner as to derail the car.

It is the object of this invention to avoid these difficulties and broadly speaking the invention consists in mounting the brake heads individually so that should one be torn away the others could operate independently thereof.

A further object of the invention is to provide means for jointly operating all of the brake shoes of a truck with a single brake rod.

Further objects of the invention will appear as the following specific description is read in connection with the accompanying drawing, which forms a part of this application, and in which:—

Figure 1 is a top plan view of a truck showing my device applied thereto. Fig. 2 is a transverse section taken on the line 2—2 of Fig. 1. Fig. 3 is a longitudinal section on the line 3—3 of Fig. 1.

Referring more particularly to the drawing, 1 represents an ordinary truck having the usual bolster connecting the opposite sides thereof and with the columns 3 slightly exaggerated or enlarged, as at 4, for a purpose to be hereinafter explained. Extending across the truck on opposite sides of the bolster and parallel therewith are rock lever shafts 5 upon opposite ends of which are journaled rock levers 6. These levers are connected together at their upper ends by cross bars 7 which carry the pivoted levers 8 and 9. These levers are connected together at one end by a link 10 and the opposite end of the lever 9 is connected to an arm 11 which is secured to the upper part of the bolster and extends at right angles thereto over one of the connecting bars 7. The opposite end of the lever 8 is connected directly to the operating rod 12 which is pivotally connected to the lever of the air rigging (not shown).

Pivotally suspended from suitable pins 13 removably secured in the enlarged portion of the columns 3 are brake head hangers 14 which are bifurcated at their lower ends so as to receive the brake heads 15 arranged so as to engage the treads of the wheels 16. These hangers are freely pivoted and permit the brake heads or shoes thereon to be thrown into engagement with the wheels by the lower end of the rock levers 6.

It will be noticed that when the lever 8 is operated by the brake rod 12 through the lever, not shown, the link 10 will be pulled and the lever 9 operated to throw the rock levers into engagement with the brake heads. It will also be noticed that if either one of the brake shoes or the heads which support the same wear out, the hanger for these brake shoes may be removed independent of the others or if the hanger is torn out accidentally it may be replaced without taking up much time and the brakes may operate without it for a short period. If one of the brake hangers is torn away it drops down beneath the truck and is lost but the damage done is slight as compared with the case when the head is connected directly to the beam and the entire beam and connecting mechanism torn away and thrown under the truck, possibly derailing the truck.

Having thus described the invention, what I claim as new is:—

In a device of the class described, the combination with a truck having track wheels mounted thereon and a bolster, of an independent brake hanger for each wheel, independent rock levers to operate each brake, said levers being free of the hangers, means for connecting opposite rock levers on the same side of the bolster, a brake rod, a lever pivoted on each connecting means, a connection between one end of one of said levers and the bolster, a connection between the opposite end of said lever and the other lever, and a brake rod pivoted to the opposite end of the other lever.

In testimony whereof I affix my signature in presence of two witnesses.

SAMUEL M. WRATTEN.

Witnesses:
ELMER E. HASTINGS,
WILLIAM P. WALTER.